United States Patent
Lesko

(10) Patent No.: US 9,217,481 B2
(45) Date of Patent: Dec. 22, 2015

(54) HYDRAULICALLY-OPERATED ACTUATOR FOR DRAWWORKS

(71) Applicant: Gerald Lesko, Edmonton (CA)

(72) Inventor: Gerald Lesko, Edmonton (CA)

(*) Notice: Subject to any disclaimer, the term of this patent is extended or adjusted under 35 U.S.C. 154(b) by 474 days.

(21) Appl. No.: 13/857,543

(22) Filed: Apr. 5, 2013

(65) Prior Publication Data

US 2013/0319219 A1    Dec. 5, 2013

Related U.S. Application Data

(60) Provisional application No. 61/653,280, filed on May 30, 2012.

(51) Int. Cl.
| | |
|---|---|
| *F01B 31/00* | (2006.01) |
| *F16D 65/18* | (2006.01) |
| *B66D 1/28* | (2006.01) |
| *F16D 49/12* | (2006.01) |
| *B66D 1/14* | (2006.01) |
| *B66D 5/10* | (2006.01) |
| *F16D 49/08* | (2006.01) |
| *F16D 65/28* | (2006.01) |
| *F16D 121/04* | (2012.01) |

(52) U.S. Cl.
CPC *F16D 65/18* (2013.01); *B66D 1/14* (2013.01); *B66D 1/28* (2013.01); *B66D 5/10* (2013.01); *F16D 49/08* (2013.01); *F16D 49/12* (2013.01); *F16D 65/28* (2013.01); *F16D 2121/04* (2013.01)

(58) Field of Classification Search
CPC ............ B66D 5/10; F16D 65/10; F16D 49/12
See application file for complete search history.

(56) References Cited

U.S. PATENT DOCUMENTS

| | | | | |
|---|---|---|---|---|
| 3,858,488 A | * | 1/1975 | Newstead | F16D 65/22 188/170 |
| 5,373,919 A | * | 12/1994 | Siegrist | F16D 53/00 188/250 G |

\* cited by examiner

*Primary Examiner* — Edward Look
*Assistant Examiner* — Daniel Collins
(74) *Attorney, Agent, or Firm* — Dinsmore & Shohl LLP

(57) ABSTRACT

A hydraulically-operated actuator for a braking mechanism on a cable drawworks is provided. The actuator can have an enclosed tubular main body capable of being connected to an external hydraulic system. The main body can further contain a spring-opposed hydraulic piston connected to an actuator rod. The actuator rod can extend out of the main body and can connect to a braking system for the drawworks. In operation, the springs can push on the hydraulic piston and hold the actuator rod in a fully extended position to engage the braking system. When pressure from the external hydraulic system is applied to the hydraulic piston, the hydraulic piston can compress the springs and retract the actuator rod into the main body, which can disengage the braking system.

20 Claims, 13 Drawing Sheets

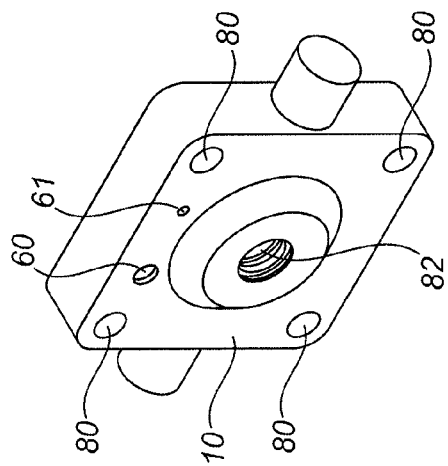
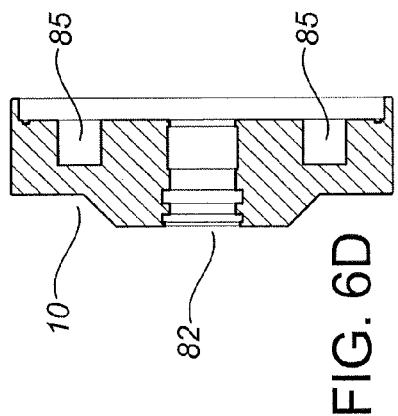
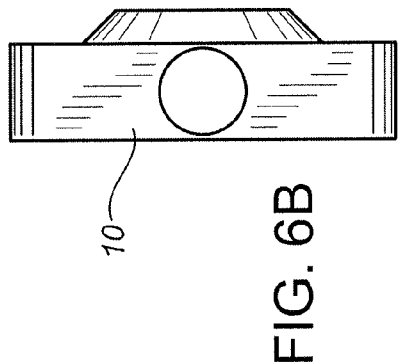
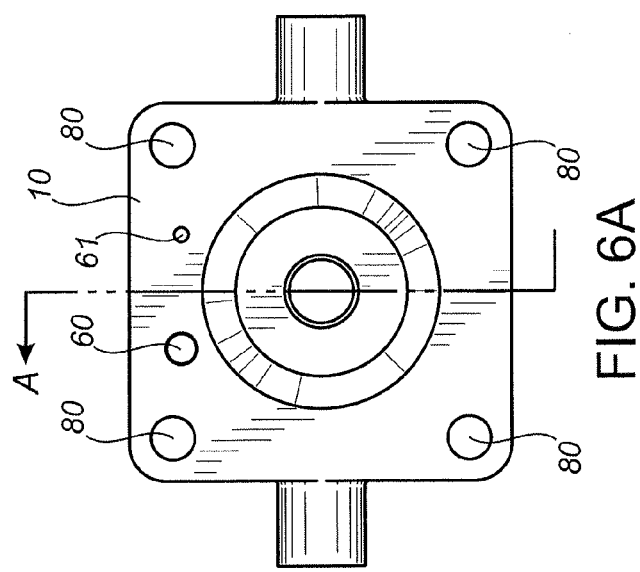

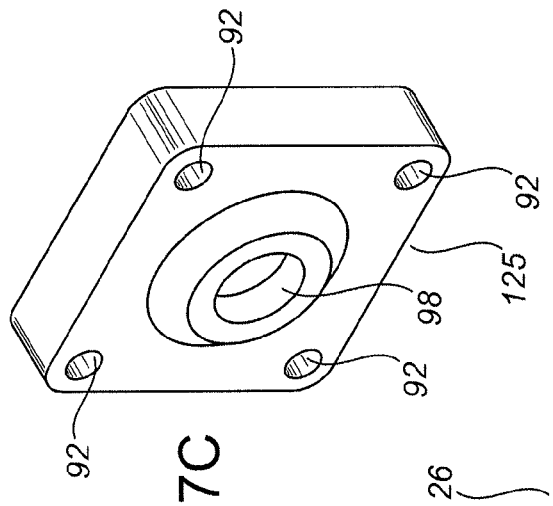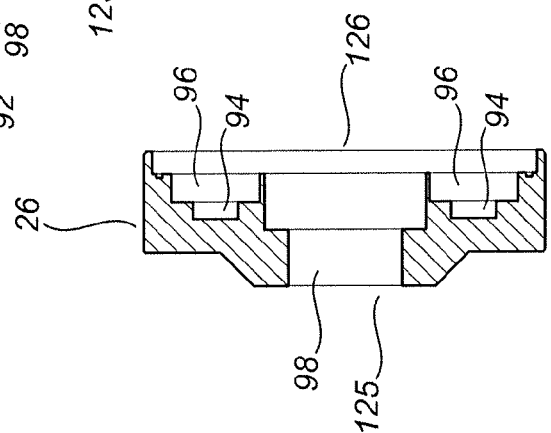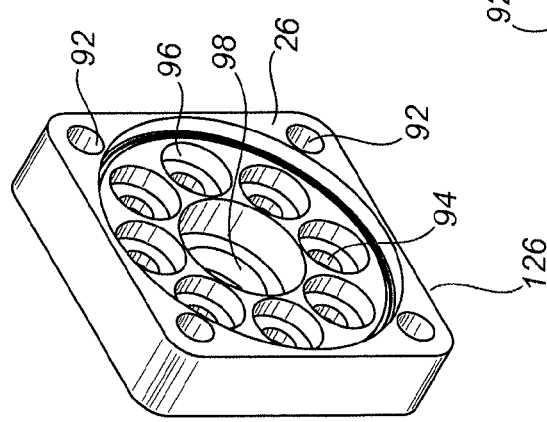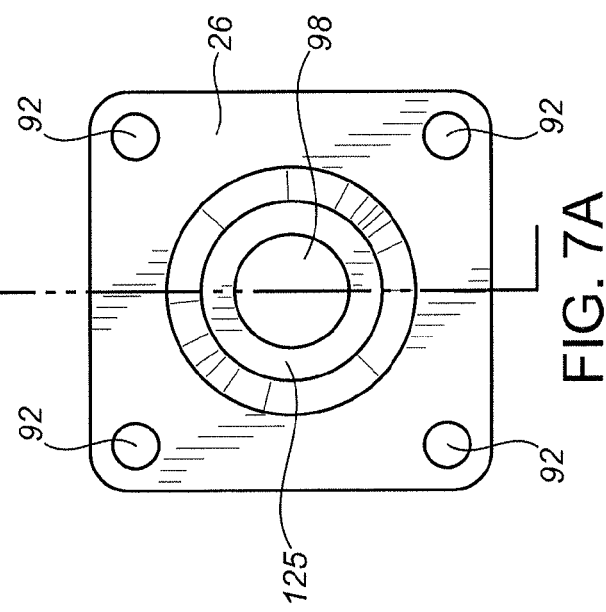

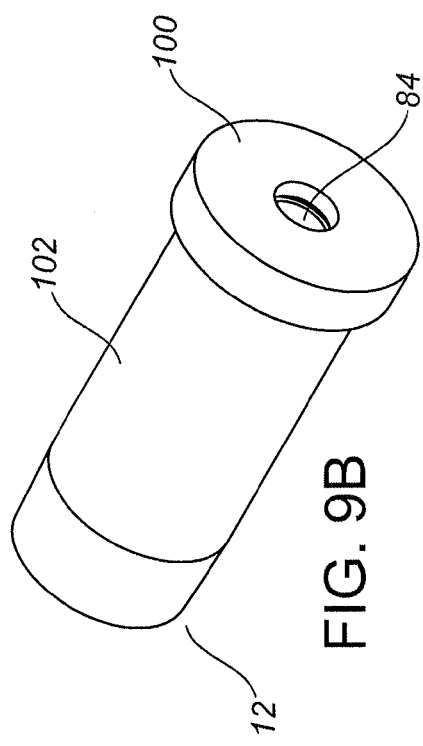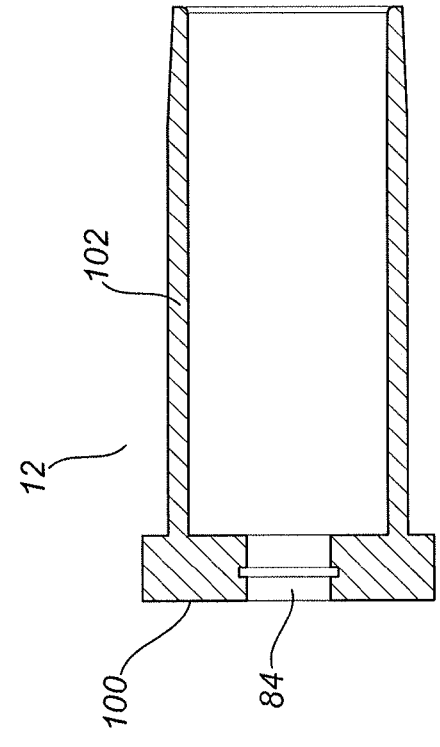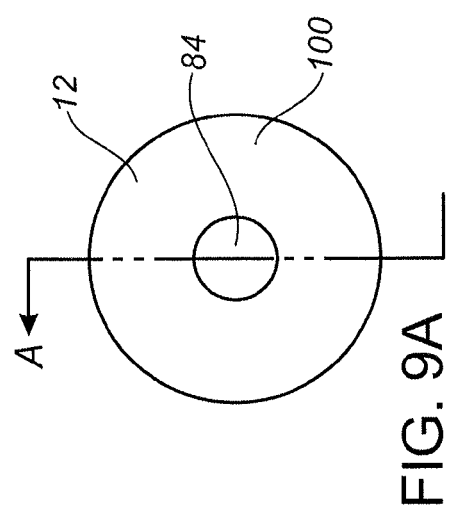

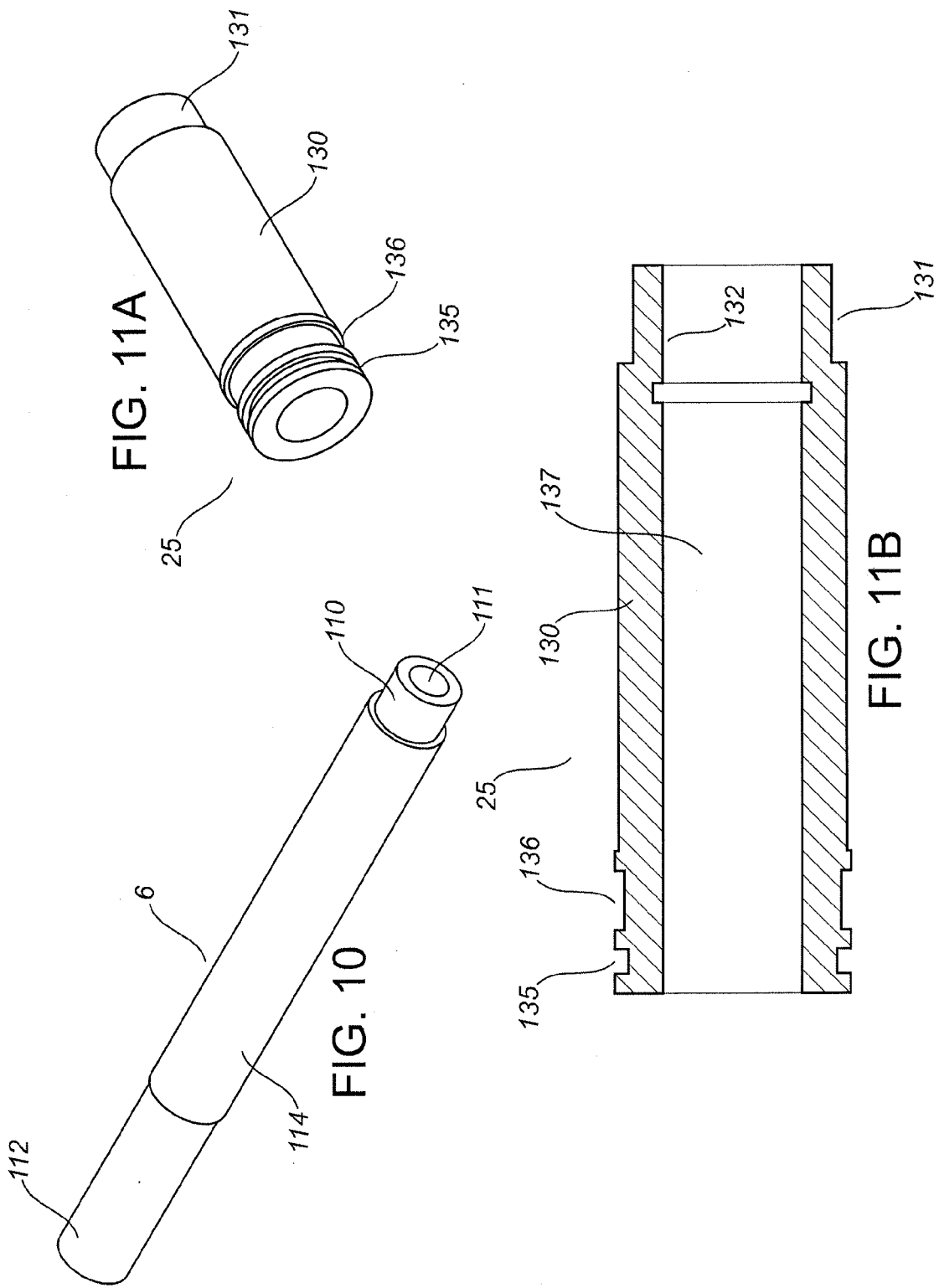

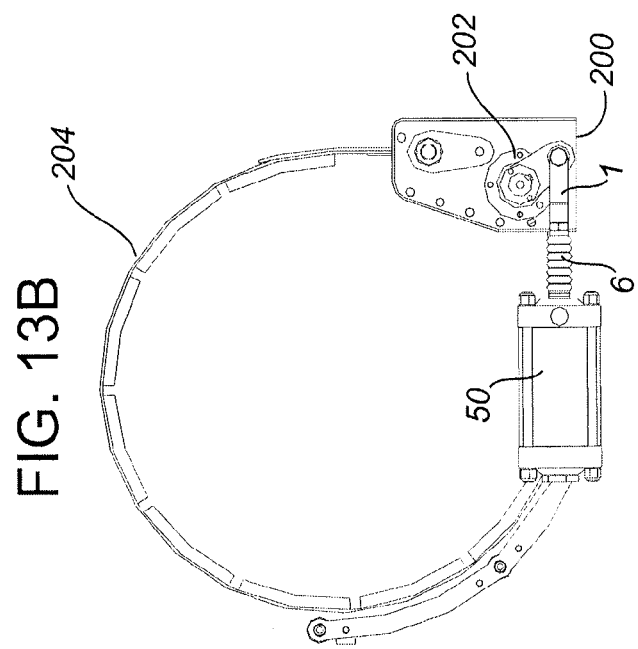
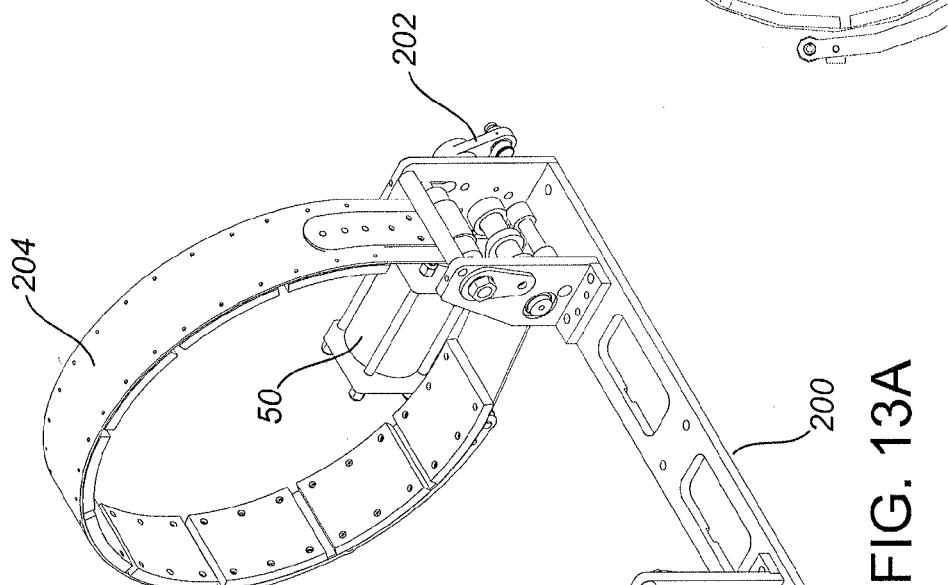
FIG. 13A
FIG. 13B

HYDRAULICALLY-OPERATED ACTUATOR FOR DRAWWORKS

CROSS REFERENCE TO RELATED APPLICATIONS

This application claims priority of U.S. Provisional Patent Application Ser. No. 61/653,280, entitled "Hydraulically-Operated Actuator for Drawworks", filed May 30, 2012, and hereby incorporates the same provisional application by reference herein in its entirety.

TECHNICAL FIELD

The present disclosure is related to the field of hydraulic actuators, in particular, linear hydraulic actuators for use in braking systems on electric drawworks or winches.

BACKGROUND

It is known to use pneumatic actuators to operate braking systems on electric drawworks, such as those disclosed in U.S. Pat. Nos. 7,527,245 and 8,079,569. Referring to FIG. 1, an example of such drawworks is shown and labelled as A, with the pneumatic actuators labelled as B. Such actuators are pneumatically powered to compress biasing springs contained therein, and to retract an actuating rod that removes force applied to brake bands C disposed around brake drums E on drawworks A, thereby allowing cable drum D on drawworks A to rotate. Upon removal of the pressurized air to actuators B, the biasing springs extend the actuating rod to apply force or tension to brake bands C, thereby stopping rotation of cable drum D. Pneumatically-operated actuators have shortcomings, one of which includes their susceptibility to corrosion and, therefore, failure to operate correctly once corroded. Another shortcoming is that air is compressible, which can make the control of pneumatically-operated actuators in a braking mechanism for a drawworks difficult.

It is, therefore, desirable to provide a hydraulically-operated actuator for a braking mechanism for a drawworks that overcomes the shortcomings of pneumatically-operated actuators.

SUMMARY

A hydraulic actuator for a braking system for a drawworks is provided. In some embodiments, the actuator can comprise a main body with a rod end and a butt end enclosing a fixed piston and a moveable cylinder. The moveable cylinder can comprise a head that can be connected to a rod extending out through the rod end of the main body, with the rod configured to receive a clevis or some other type of functional attachment. One or more springs can be placed between the butt end of the main body and the moveable cylinder, or against a spring pusher configured to operate with the moveable cylinder such that the moveable cylinder is pressed up against the rod end of the main body and the movement of the moveable cylinder towards the butt end of the main body is resisted. Hydraulic fluid can be injected into the rod end of the main body at a sufficient pressure to overcome this resistive force, causing the moveable cylinder to compress the one or more springs and to retract the rod into the main body. The hydraulic fluid can be released from the main body, wherein the one or more springs can expand to cause the movable cylinder to return to its default position against the rod end of the main body, causing the rod to fully extend out of the main body. In some embodiments, the rod can be operatively coupled to a braking mechanism on a drawworks wherein the rod is retracted into the actuator to remove a braking force applied to the drawworks when hydraulic fluid is injected into the actuator under pressure, and wherein the rod is extended from the actuator when the hydraulic fluid is released from the actuator wherein the one or more springs cause the rod to extend from the actuator to apply a braking force to the drawworks. In some embodiments, the actuator is constantly filled with hydraulic fluid, which can keep all of the internal components lubricated and can further prevent or protect the internal components from corrosion, which can compromise their operation. Furthermore, as hydraulic fluid is incompressible, it is possible to provide a greater deal of control over the operation of the actuator through an external hydraulic fluid control system, which can include the use of a spool valve, as well known to those skilled in the art, to inject pressurized hydraulic fluid into the actuator or to release pressurized hydraulic fluid from the actuator.

While the hydraulically-operated actuator described and claimed herein can have application in the operation of braking mechanisms for drawworks or winches, it is obvious to those skilled in the art that the hydraulically-operated actuator described and claimed herein can be used in any number of applications requiring a linear actuating rod mechanisms.

Broadly stated, in some embodiments, a hydraulically-operated actuator is provided, the actuator comprising: a tubular main body, the main body comprising a first end and a second end thereby defining a chamber therebetween, the main body further comprising a first end cap disposed at the first end and a second end cap disposed at the second end, thereby enclosing the chamber, the second end cap further comprising a first aperture for injecting pressurized hydraulic fluid into the chamber and a second aperture for releasing the hydraulic fluid from the chamber; a fixed piston comprising first and second ends, the first end operatively coupled to the first end cap within the chamber, thereby defining an annular space about the fixed piston within the chamber; a piston cylinder slidably disposed in the chamber, the piston cylinder configured for slidably receiving the second end of the fixed piston; at least one spring disposed in the annular space between the first end cap and the piston cylinder, the at least one spring configured to resist the motion of the piston cylinder towards the first end cap; and an actuating rod operatively coupled to the piston cylinder, the actuating rod comprising first and second ends, the first end operatively coupled to the head of the piston cylinder, wherein the second end extends from the head of the piston cylinder and through a third aperture disposed through the second end cap.

Broadly stated, in some embodiments, the tubular main body comprises a cylindrical main body.

Broadly stated, in some embodiments, the fixed piston can further comprise a piston passageway disposed between the first and second ends thereof thereby providing communication therebetween.

Broadly stated, in some embodiments, the first end cap can further comprise a breather cap disposed thereon, the breather cap in communication with the piston passageway.

Broadly stated, in some embodiments, the actuator can further comprise at least one anti-torsion bar disposed in the chamber between the first and second end caps, the piston cylinder configured to be slidably disposed on the at least one anti-torsion bar.

Broadly stated, in some embodiments, the at least one spring can be disposed about the at least anti-torsion bar.

Broadly stated, in some embodiments, the piston cylinder can further comprise a spring pusher, wherein the at least one spring is disposed between the first end cap and the spring pusher.

Broadly stated, in some embodiments, the at least one spring can comprises eight springs disposed in a spaced-apart configuration in the annular space.

Broadly stated, in some embodiments, the at least one anti-torsion bar can comprise eight anti-torsion bars disposed in a spaced-apart configuration in the annular space.

Broadly stated, in some embodiments, the actuator can further comprise a clevis coupler operatively disposed on the second end of the actuating rod.

Broadly stated, in some embodiments, an improved drawworks is provided, the improved drawworks comprising a cable drum, at least one brake drum, at least one brake band disposed about the at least one brake drum, and a braking mechanism for operating the at least one brake band, the improvement comprising a hydraulically-operated actuator disposed in the braking mechanism, the actuator comprising: a tubular main body, the main body comprising a first end and a second end thereby defining a chamber therebetween, the main body further comprising a first end cap disposed at the first end and a second end cap disposed at the second end, thereby enclosing the chamber, the second end cap further comprising a first aperture for injecting pressurized hydraulic fluid into the chamber and a second aperture for releasing the hydraulic fluid from the chamber; a fixed piston comprising first and second ends, the first end operatively coupled to the first end cap within the chamber, thereby defining an annular space about the fixed piston within the chamber; a piston cylinder slidably disposed in the chamber, the piston cylinder configured for slidably receiving the second end of the fixed piston; at least one spring disposed in the annular space between the first end cap and the piston cylinder, the at least one spring configured to resist the motion of the piston cylinder towards the first end cap; and an actuating rod operatively coupled to the piston cylinder, the actuating rod comprising first and second ends, the first end operatively coupled to the head of the piston cylinder, wherein the second end extends from the head of the piston cylinder and through a third aperture disposed through the second end cap

BRIEF DESCRIPTION OF THE DRAWINGS

FIG. 6A is a front elevation view depicting the rod end cap of the hydraulically-operated actuator of FIG. 2.

FIG. 6B is a side elevation view depicting the rod end cap of FIG. 6A.

FIG. 6C is a perspective front view depicting the rod end cap of FIG. 6A.

FIG. 6D is a side elevation cross-sectional view depicting the rod end cap of FIG. 6A along section line A.

FIG. 7A is a front elevation view depicting the piston end cap of the hydraulically-operated actuator of FIG. 2.

FIG. 7B is a perspective view depicting the interior of the piston end cap of FIG. 7A.

FIG. 7C is a perspective view depicting the exterior of the piston end cap of FIG. 7A.

FIG. 7D is a side elevation cross-sectional view depicting the piston end cap of FIG. 7A along section line A.

FIG. 9A is a front elevation view depicting the piston cylinder of the hydraulically-operated actuator of FIG. 2.

FIG. 9B is a perspective view depicting the piston cylinder of FIG. 9A.

FIG. 9C is a side cross-sectional view depicting the piston cylinder of FIG. 9A.

FIG. 10 is a perspective view depicting the actuator rod of the hydraulically-operated actuator of FIG. 2.

FIG. 11A is a perspective view depicting the piston of the hydraulically-operated actuator of FIG. 2.

FIG. 11B is a side cross-sectional view depicting the piston of FIG. 11A.

FIG. 13A is a perspective view depicting a braking mechanism for the drawworks of FIG. 1 with the hydraulically-operated actuator of FIG. 2.

FIG. 13B is a side elevation view depicting the braking mechanism of FIG. 13A.

DETAILED DESCRIPTION OF EMBODIMENTS

A hydraulically-operated actuator is provided. In some embodiments, the actuator can be used as part of a braking mechanism for a drawworks mechanism like the one disclosed in U.S. Pat. No. 7,527,245 and No. 8,079,569.

Figure 2:
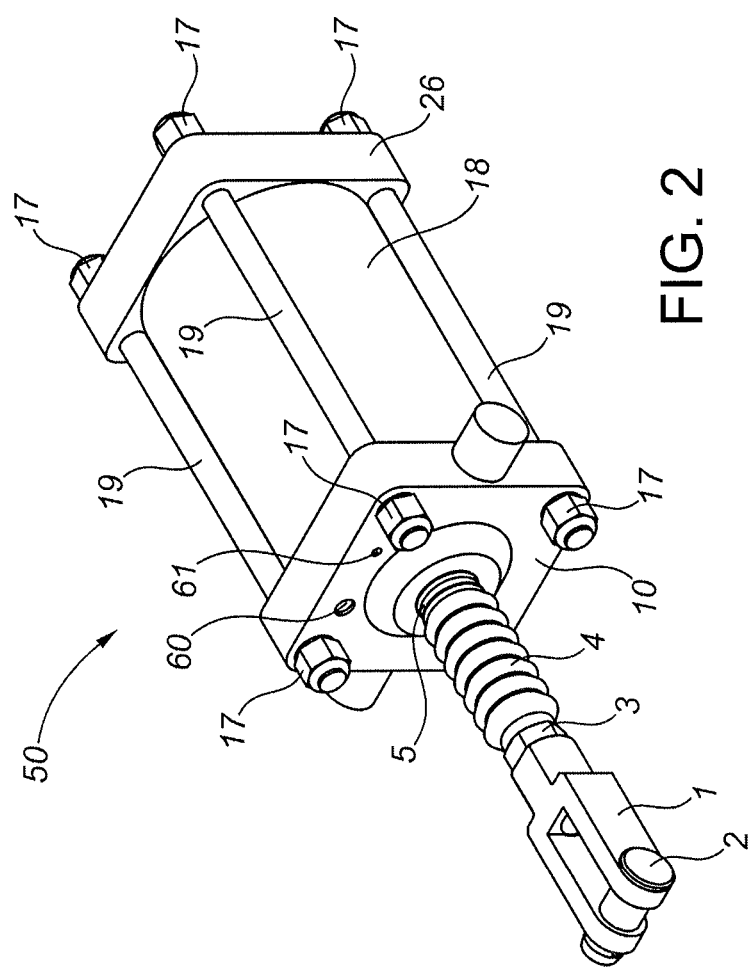
FIG. 2 is a perspective view depicting one embodiment of a hydraulically-operated actuator.
Figure 3:
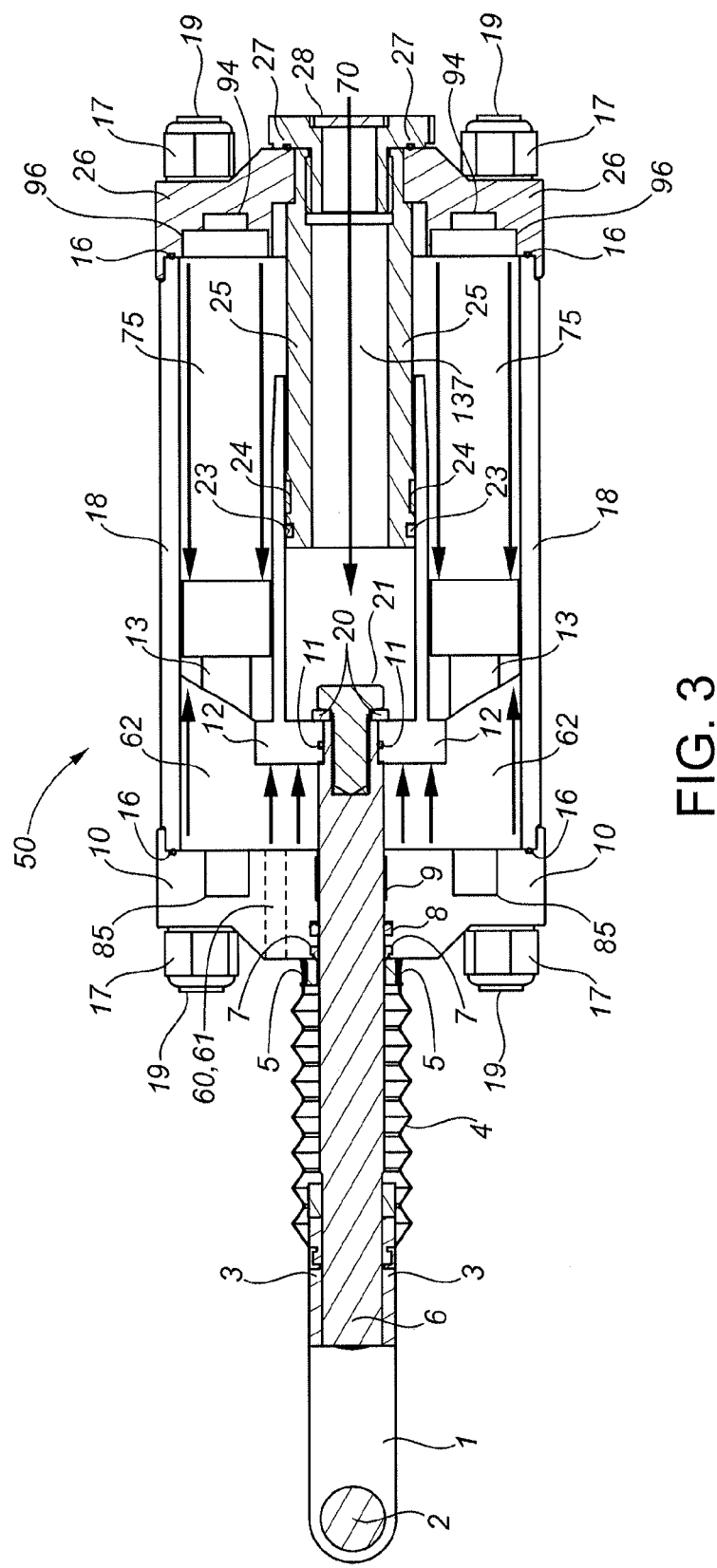
FIG. 3 is a side elevation cross-sectional view depicting the hydraulically-operated actuator of FIG. 2 with several of the internal components removed.

Referring to FIGS. 2 through to 12C, one embodiment of a hydraulically-operated actuator is shown. In some embodiments, hydraulically-operated actuator 50 can comprise tubular main body 18 enclosed on one end by rod end cap 10 and on the other end by piston end cap 26. In some embodiments, main body 18 can be cylindrical. Rod end cap 10, main body cylinder 18 and piston end cap 26 can be held together by end cap bolts 19, which can run parallel to the central axis of main body cylinder 18 and pass through rod end cap bolt passages 80 and piston end cap passages 92. End cap nuts 17, which can screw onto both ends of end cap bolts 19, can fasten rod end cap 10, main body cylinder 18 and piston end cap 26 together. Main body o-rings 16 can be placed in rod end cap main body o-ring slot 155 and in piston end cap main body o-ring slot 160, and can provide an airtight barrier created between main body cylinder 18 and rod end cap 10, and between main body cylinder 18 and piston end cap 26, respectively.

In some embodiments, spring pusher 13 can be slidably disposed within annular spring chamber 75 of main body cylinder 18. In some embodiments, one or more anti-torsion bars 14 can be disposed in spring chamber 75 in a spaced-apart configured therein, and can be oriented parallel to the central axis of main body cylinder 18. In some embodiments, anti-torsion bars 14 can be disposed between rod end cap anti-torsion bar ports 85 and piston end cap anti-torsion bar ports 94. In further embodiments, anti-torsion bars 14 can pass through anti-torsion bar passages 88 disposed through spring pusher 13. In some embodiments, springs 15 can be disposed coaxially around anti-torsion bars 15 between spring pusher 13 and piston end cap 26. In some embodiments, springs 15 can be disposed coaxially about anti-torsion bars 14 and further disposed in spring openings 90 disposed in spring pusher 13, which can be coaxial with anti-torsion bar passages 88. Springs 15 can be further disposed in piston end cap spring openings 96 disposed in piston end cap 26, which can be coaxial with piston end cap anti-torsion bar openings 94.

In some embodiments, piston cylinder 12, can comprise piston cylinder head 100 and piston cylinder sidewall 102, and can be further disposed coaxially with spring pusher 13. In some embodiments, the outer diameter of piston cylinder sidewall 102 can correspond to the inner diameter of piston cylinder port 86 disposed through spring pusher 13 such that piston cylinder sidewall 102 can pass though piston cylinder port 86. The diameter of piston cylinder head 100 is configured such that piston head 100 is unable to pass through piston cylinder port 86.

In some embodiments, actuator rod 6 can comprise piston cylinder tie-in end 110, threaded bolt opening 111, clevis tie-in end 112 and rod midsection 114, which can pass through rod end cap 10 through rod passage 82 disposed therethrough. The outer diameter of rod midsection 114 can correspond to the inner diameter of rod passage 82 such that actuator rod 6 can slide back and forth through rod passage 82 at rod midsection 114. In some embodiments, rod wiper 7 can disposed coaxially along rod passage 82 in rod wiper slot 150; rod seal 8 can be disposed coaxially along rod passage 82 in rod seal slot 151; and rod wear band 9 can be disposed coaxially along rod passage 82 in rod wear band slot 152. In some embodiments, rod wiper 7, rod seal 8 and rod wear band 9 can maintain a slight gap between rod passage 82 and rod midsection 114. Rod wiper 7 can clear external dirt and debris from rod midsection 114. Rod seal 8 can provided an airtight barrier between rod passage 82 and rod midsection 114. Rod wear band 9 can prevent wear on rod passage 82 from rod midsection 114.

In some embodiments, piston cylinder tie-in end 110 of actuator rod 6 can pass through rod port 84 of piston cylinder 12 wherein bolt 21 can be screwed into threaded bolt opening 111 of actuator rod 6 such that the edge of rod midsection 114 fits tightly against piston cylinder head 100. This fit can be assisted by washer 20, which can be placed between bolt 21 and piston cylinder head 100. Rod o-ring 11 can be placed coaxially with rod port 84 in rod o-ring slot 105, and can provide an airtight barrier is created between piston cylinder tie-in end 110 and rod port 84.

In some embodiments, the portion of rod midsection 114 extending beyond rod end cap 10 can be covered by rod boot 4, which can prevent dirt, dust or debris from entering hydraulically-operated actuator 50 through rod passage 82. Rod boot 4 can be made of a compressible, resilient material in an accordion-like configuration and can be secured in place by a compression fit between jam nut 3, which can screw onto the threads of clevis tie-in end 112 to fit tightly against the edge of rod midsection 114, and rod boot centralizer 5, which can have an inner diameter corresponding to the outer diameter of rod midsection 114 such that rod boot 5 can slide around rod midsection 114 and sit against rod end cap outer face 120. In some embodiments, actuator clevis 2 can screw tightly onto to clevis tie-in end 112.

In some embodiments, piston 25 can comprise piston sidewall 130 and piston retainer end 131, which can pass though piston retainer port 98 disposed through piston end cap 26, and which can be coaxial with main body cylinder 18, piston cylinder 12, spring pusher 13 and actuator rod 6. Piston 25 can further comprise piston passageway 137 extending therethrough. In some embodiments, piston 25 can be configured such that the outer diameter of piston retainer end 131 can correspond to the inner diameter of piston retainer port 98. In some embodiments, the outer diameter of piston sidewall 130 can be wider than piston retainer port 98 while corresponding to the inner diameter of piston cylinder sidewall 102 such that piston cylinder 12 can slide back and forth along piston 25, which can remain fixed in place. In some embodiments, piston retainer 28 can comprise piston retainer threads 171 that can screw into piston threads 132 to secure the edge of piston sidewall 130 against piston end cap inner face 126 while piston retainer flange 172 can be secured against piston end cap outer face 125. In some embodiments, piston retainer o-ring 27, can be disposed in piston retainer o-ring slot 170 on piston retainer 28, can provide a seal between piston retainer flange 172 and piston end cap outer face 125.

In some embodiments, piston sidewall 130 can comprise piston seal slot 135 with piston seal 23 disposed therein, and can further comprise piston wear band slot 136 with piston wear band 24 disposed therein. Piston seal 23 can provide an airtight barrier between the outside of piston sidewall 130 and the inside of piston cylinder sidewall 102. Piston wear band 24 can prevent wear on the inside of piston cylinder sidewall 102 from the outside of piston sidewall 130. In some embodiments, the lengths of piston cylinder 12 and piston 25 can be configured such that the piston cylinder sidewall 102 can overlap piston sidewall 130 regardless of the position of piston cylinder 12. In some embodiments, stroke limiter 22, can be disposed in a coaxial position within piston cylinder 12 adjacent to piston cylinder head 100, wherein stroke limiter 22 can limit the linear movement of piston cylinder 12 along piston 25. Together, piston cylinder 12 and piston passageway 137 can form piston cavity 70, which can vent to the atmosphere though piston retainer vents 173 thereby allowing piston cavity 70 to "breathe" as piston cylinder 12 moves along piston 25.

Figure 4:
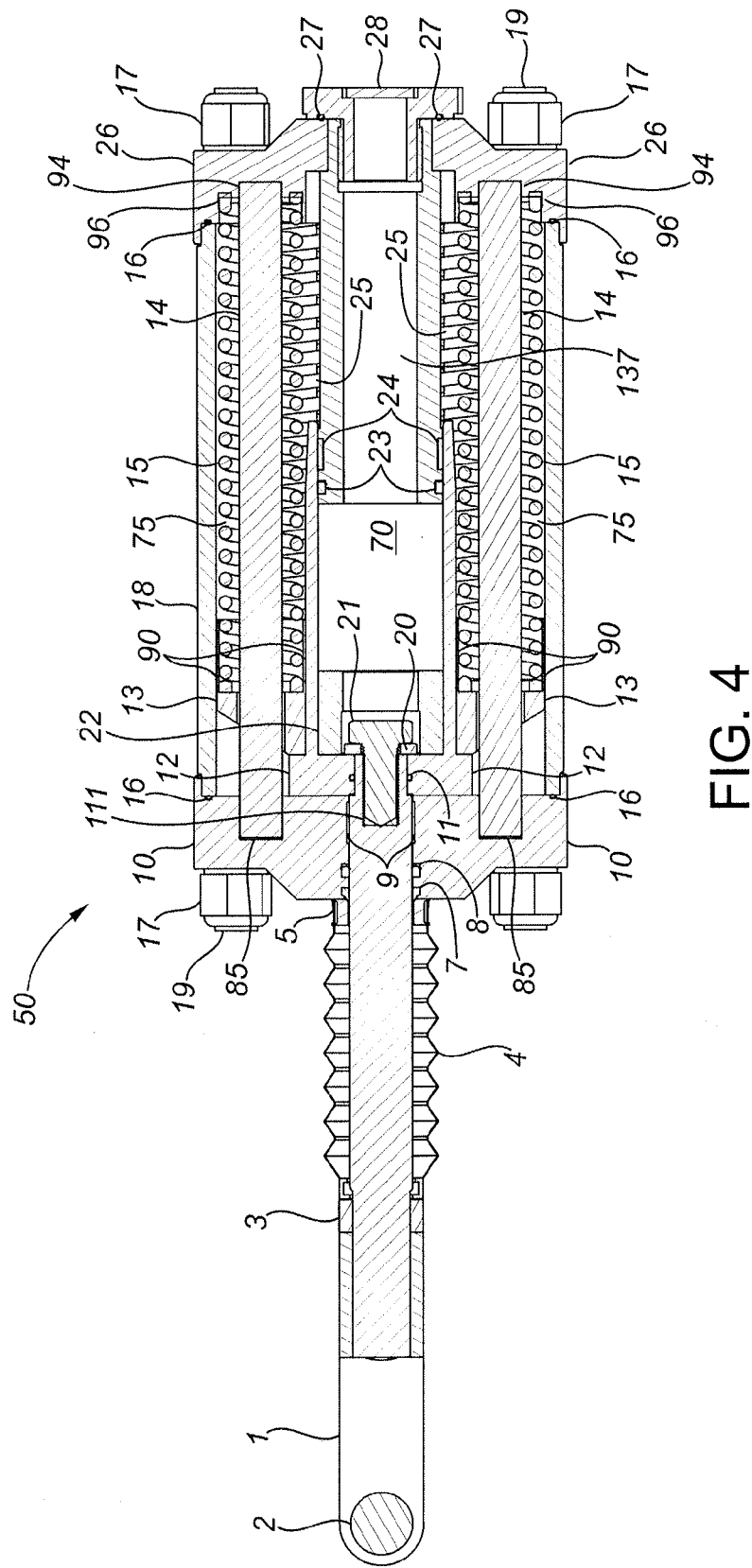
FIG. 4 is a side elevation cross-sectional view depicting the hydraulically-operated actuator of FIG. 2.
Figure 5:
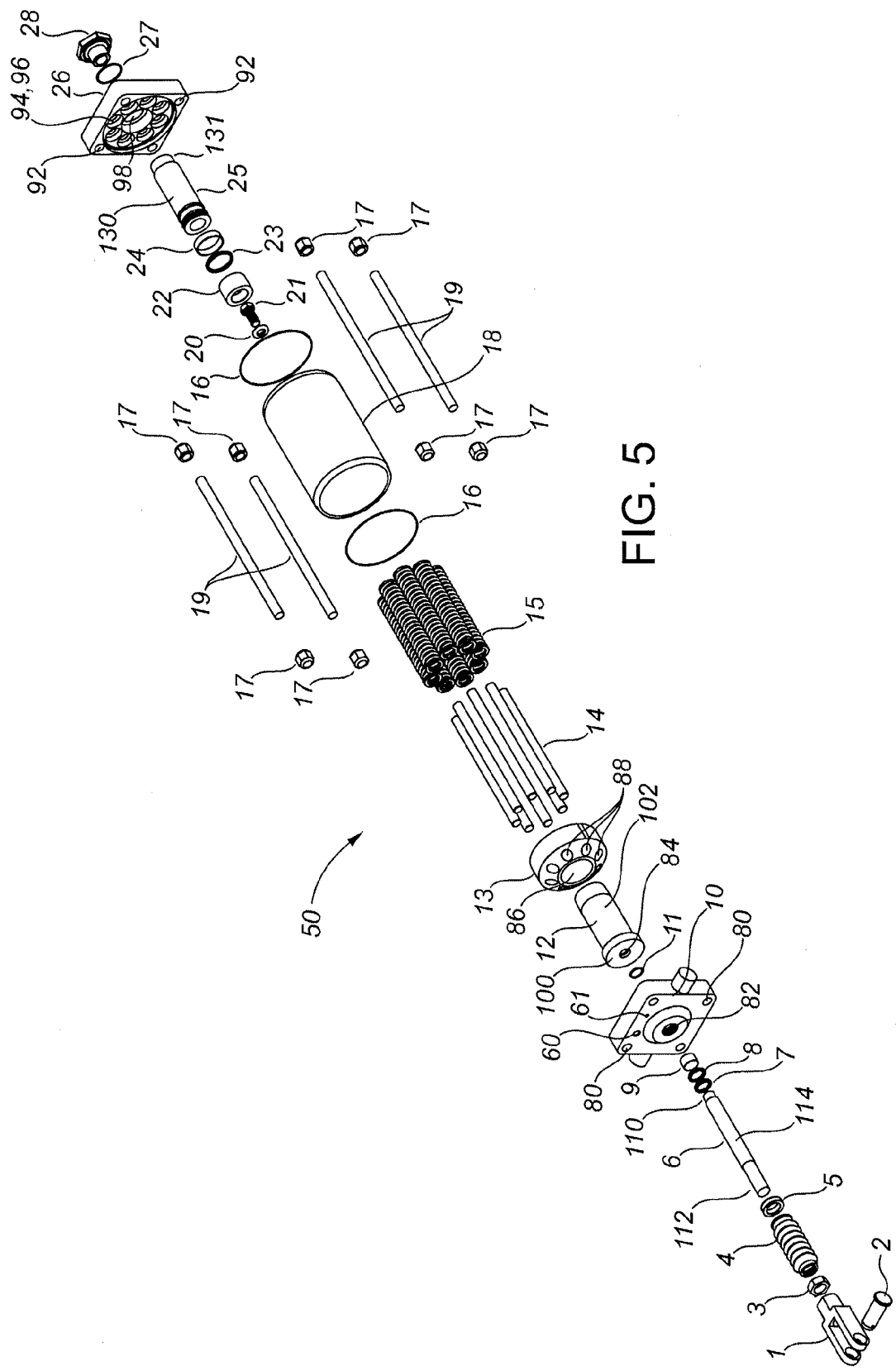
FIG. 5 is an exploded perspective view depicting the hydraulically-operated actuator of FIG. 2.
Figure 8C:
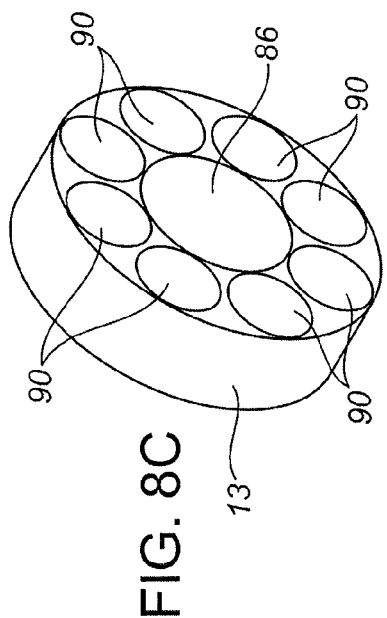
FIG. 8C is a perspective view depicting the opposite side of the spring pusher of FIG. 8A.
Figure 8D:
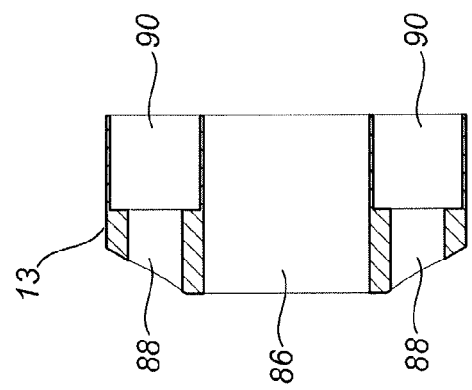
FIG. 8D is a side elevation cross-sectional view depicting the spring pusher of FIG. 8A along section line A.
Figure 8B:
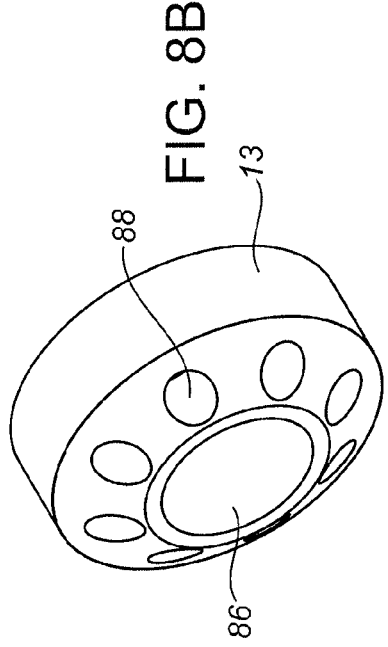
FIG. 8B is a perspective view depicting the one side of the spring pusher of FIG. 8A.
Figure 8A:
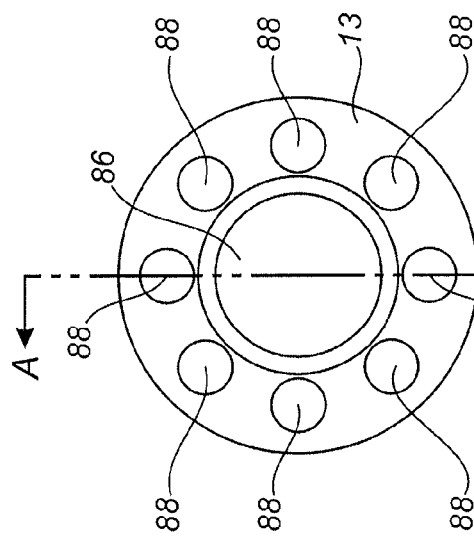
FIG. 8A is a front elevation view depicting the spring pusher of the hydraulically-operated actuator of FIG. 2.
Figure 12C:
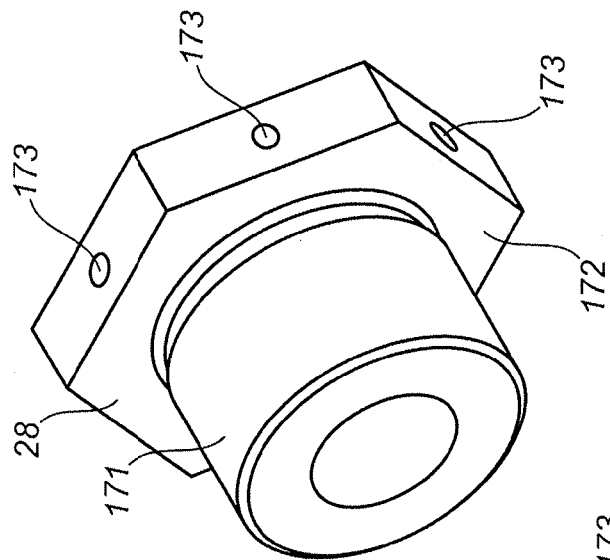
FIG. 12C is a perspective view depicting the piston retainer of FIG. 12A.
Figure 12B:
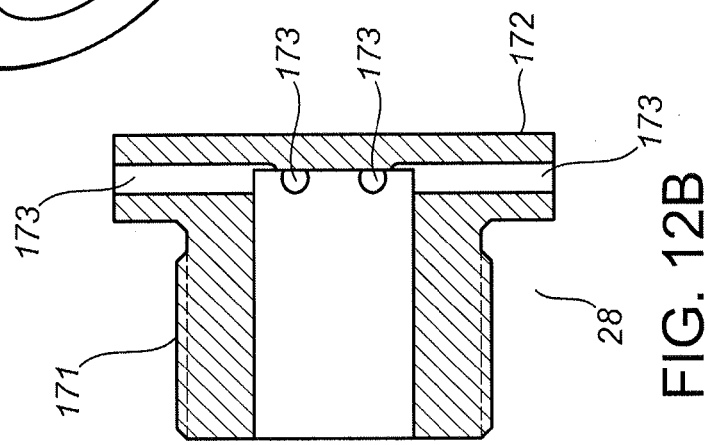
FIG. 12B is a side cross-sectional view depicting the piston retainer of FIG. 12A along section line A.
Figure 12A:
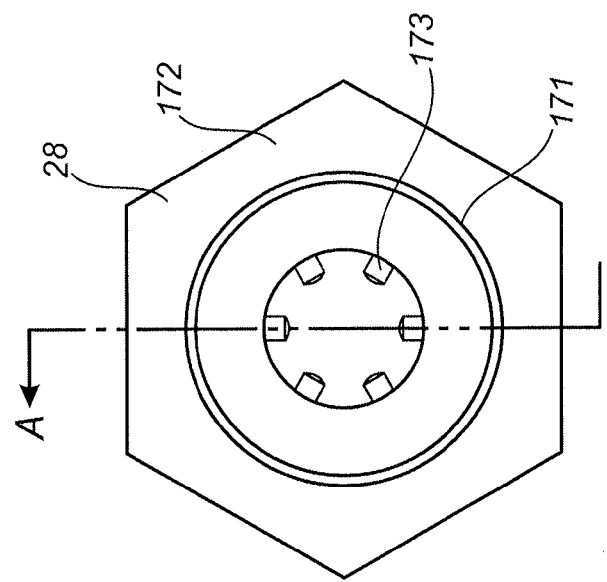
FIG. 12A is a front elevation view depicting the piston retainer of the hydraulically-operated actuator of FIG. 2.

In operation, the default position of piston cylinder 12 is shown in FIG. 4. Springs 15 push on spring pusher 13, which can push on piston cylinder head 100 and causes piston cylinder head 100 to rest against rod end cap inner face 121. In this position, actuator rod 6 can be fully extended. In order for hydraulically-operated actuator 50 to operate, it must be filled or "primed" with hydraulic fluid. To prime hydraulically-operated actuator 50 with hydraulic fluid, hydraulic fluid can be injected through hydraulic fluid port 60 to displace air contained in hydraulically-operated actuator 50, which can exit or "bleed" through bleed port 61. Once hydraulically-operated actuator 50 is filled with hydraulic fluid, bleed port 61 can be sealed off with a screw or plug (not shown), as well known to those skilled in the art. To retract actuator rod 6, hydraulic fluid from an external hydraulic control circuit or system can be injected under pressure into hydraulic chamber 62 through hydraulic fluid port 60. Although hydraulic chamber 62 is not completely isolated from spring chamber 75, the hydraulic fluid disposed in hydraulic chamber 62 can exert pressure over a greater surface area on the combination of piston cylinder head 100 and spring pusher 13 than the hydraulic fluid disposed in spring chamber 75. Thus, when the pressure of the hydraulic fluid is great enough, the hydraulic force acting on piston cylinder head 100 and spring pusher 13 in hydraulic chamber 62 can overcome the force exerted on spring pusher 13 by springs 15 and the hydraulic pressure in spring chamber 75. When this pressure threshold is exceeded, piston cylinder 12 and spring pusher 13 can move towards piston end cap 26 until piston 25 comes into contact with stroke limiter 22. When the hydraulic pressure in hydraulic chamber 62 is released by allowing hydraulic fluid to exit hydraulic chamber 62 though hydraulic fluid port 60, the force exerted on spring pusher 13 by springs 15 can cause piston cylinder 12 to move towards rod end cap 10 until piston cylinder head 100 returns to its resting place against rod end cap inner face 121. Piston cavity 70 is sealed from hydraulic chamber 62 and spring chamber 75. Piston cavity 70 can be vented to the atmosphere through piston retainer vents 173 on piston retainer 28.

In one embodiment, hydraulically-operated brake actuator 50 can be used to operate braking bands such as the ones used on the drawworks mechanism disclosed in U.S. Pat. No. 7,527,245 and No. 8,079,569.

Figure 1:
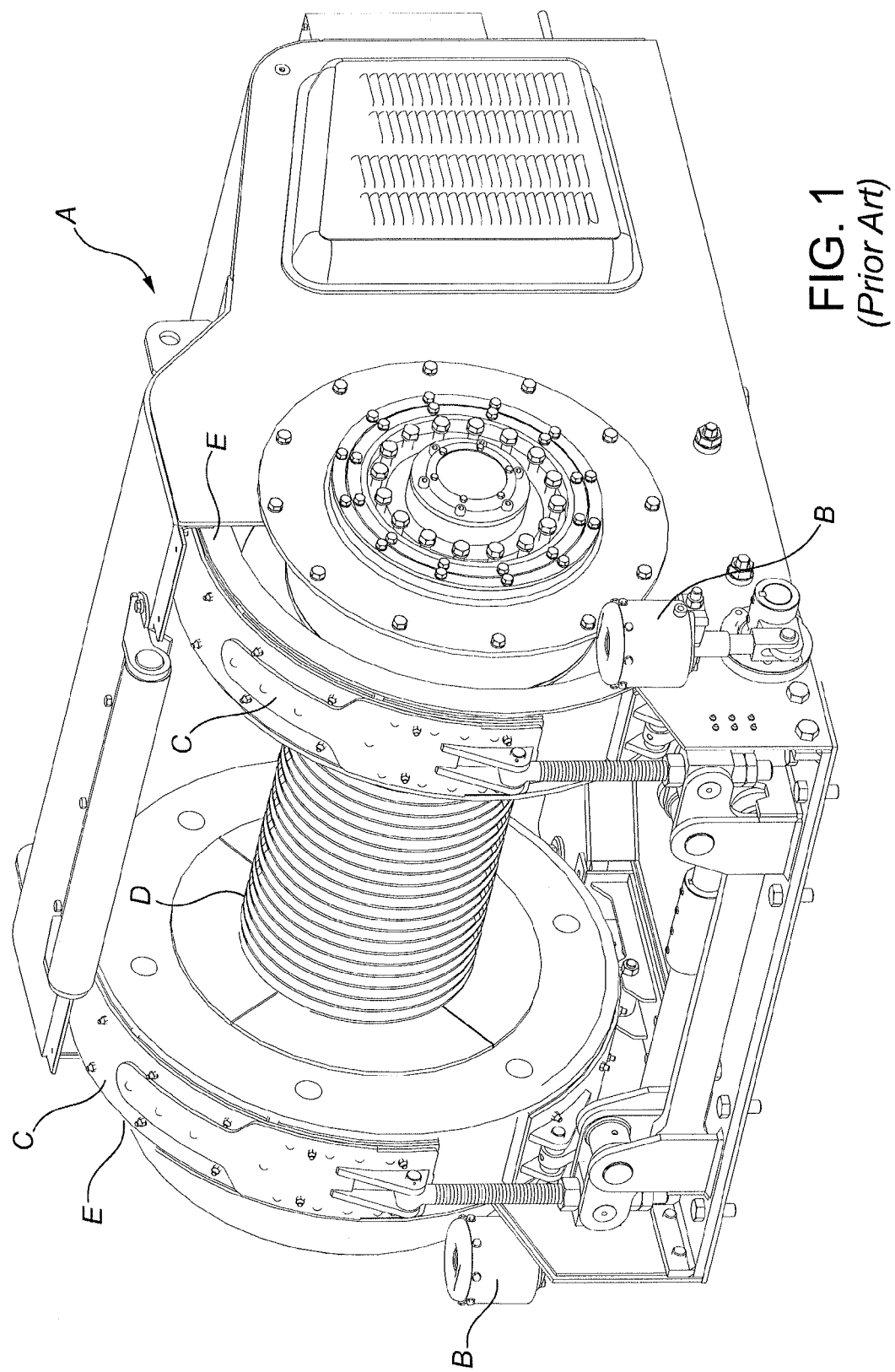
FIG. 1 is a perspective view depicting a prior art drawworks mechanism.

Referring to FIGS. 13A and 13B, hydraulically-operated brake actuator 50 can be operatively coupled to braking mechanism 200 disposed on a drawworks, such as the one shown in FIG. 1. With clevis 1 coupled to crank 202, operating hydraulically-operated actuator 50, as described above, to retract actuator rod 6 can rotate crank 202 to loosen brake band 204 disposed around a brake drum disposed on a cable drum of the drawworks, such as brake band C disposed around brake drum E of drawworks A as shown in FIG. 1 and as described in U.S. Pat. No. 7,527,245 and No. 8,079,569. When hydraulic fluid is released from hydraulically-operated actuator 50, actuator rod 6 can extend to reverse the rotation of crank 202 to tighten brake band 204 around a brake drum so as to stop the rotation of the cable drum.

Figure 14:
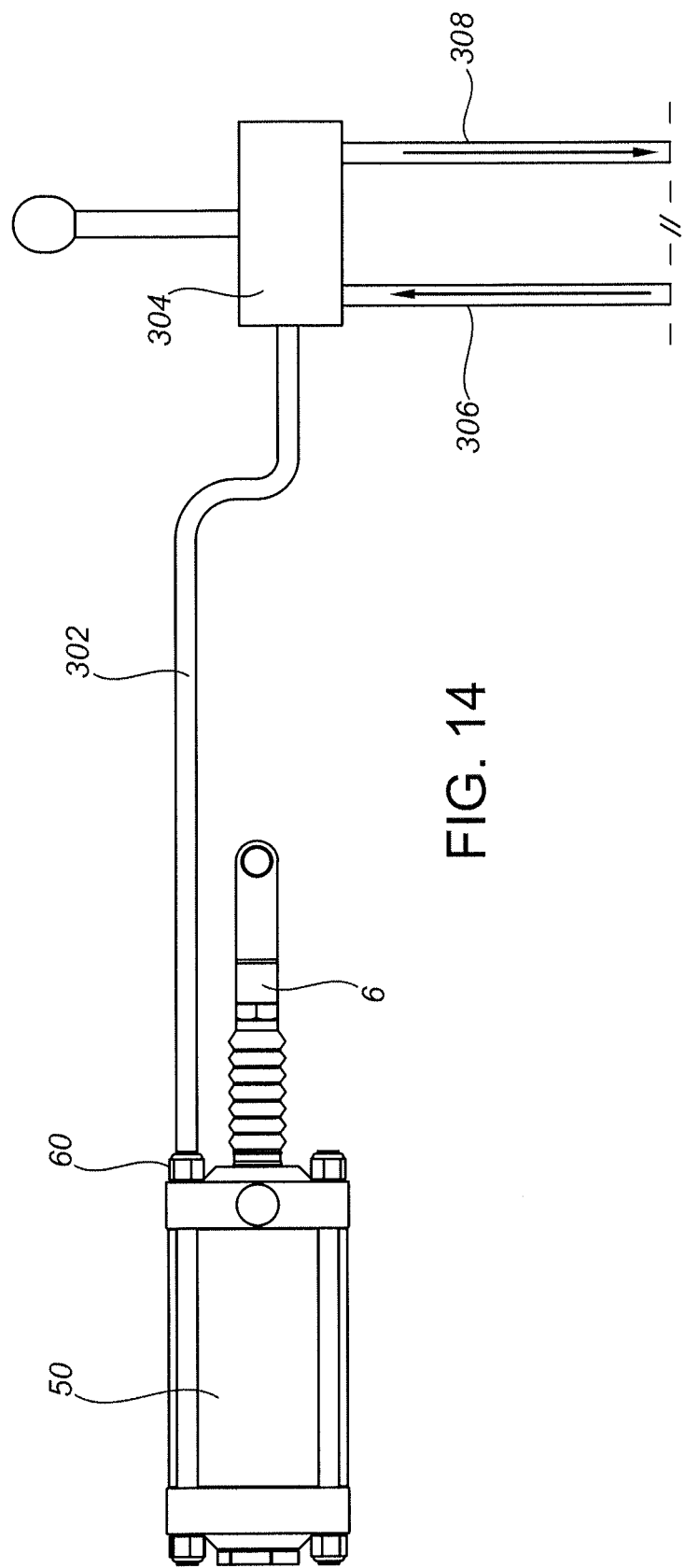
FIG. 14 is a schematic depicting a hydraulic fluid control circuit for the hydraulically-operated actuator of FIG. 2.

Referring to FIG. 14, one embodiment of a hydraulic fluid control circuit for use with hydraulically-operated actuator 50 is shown. In some embodiments, hydraulic fluid control circuit 300 can comprise valve 304, which can control pressurized hydraulic fluid supplied by a hydraulic fluid system (not shown) via supply line 306. In some embodiments, valve 304 can comprise a spool valve, as well known skilled in the art. In some embodiments, operating valve 304 can direct pressurized hydraulic fluid received from the hydraulic fluid system via supply line 306 to hydraulically-operated actuator 50 via supply line 302, which can be operatively connected to hydraulic fluid port 60. In so doing, actuator rod 6 can be retracted into hydraulically-operated actuator 50. In further embodiments, valve 304 can also be operated to allow pressurized hydraulic fluid to be released from hydraulically-operated actuator 50 through hydraulic fluid port 60, pass through supply line 302 to valve 304, and then pass through valve 304 to return line 308, which can return the released hydraulic fluid to the hydraulic fluid system. In so doing, actuator rod 6 can extend from hydraulically-operated actuator 50 due to the operation of the springs contained therein.

Although a few preferred embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

I claim:

1. A hydraulically-operated actuator, the actuator comprising:
  a) a tubular main body, the main body comprising a first end and a second end thereby defining a chamber therebetween, the main body further comprising a first end cap disposed at the first end and a second end cap disposed at the second end, thereby enclosing the chamber, the second end cap further comprising a first aperture for injecting pressurized hydraulic fluid into the chamber and a second aperture for releasing the hydraulic fluid from the chamber;
  b) a fixed piston comprising first and second ends, the first end operatively coupled to the first end cap within the chamber, thereby defining an annular space about the fixed piston within the chamber;
  c) a piston cylinder slidably disposed in the chamber, the piston cylinder configured for slidably receiving the second end of the fixed piston;
  d) at least one spring disposed in the annular space between the first end cap and the piston cylinder, the at least one spring configured to resist the motion of the piston cylinder towards the first end cap; and
  e) an actuating rod operatively coupled to the piston cylinder, the actuating rod comprising first and second ends, the first end operatively coupled to the head of the piston cylinder, wherein the second end extends from the head of the piston cylinder and through a third aperture disposed through the second end cap.

2. The actuator as set forth in claim 1, wherein the tubular main body comprises a cylindrical main body.

3. The actuator as set forth in claim 1, wherein the fixed piston further comprising a piston passageway disposed between the first and second ends thereof thereby providing communication therebetween.

4. The actuator as set forth in claim 3, wherein the first end cap further comprises a breather cap disposed thereon, the breather cap in communication with the piston passageway.

5. The actuator as set forth in claim 1, further comprising at least one anti-torsion bar disposed in the chamber between the first and second end caps, the piston cylinder configured to be slidably disposed on the at least one anti-torsion bar.

6. The actuator as set forth in claim 5, wherein the at least one spring is disposed about the at least anti-torsion bar.

7. The actuator as set forth in claim 1, wherein the piston cylinder further comprises a spring pusher, wherein the at least one spring is disposed between the first end cap and the spring pusher.

8. The actuator as set forth in claim 1, wherein the at least one spring comprises eight springs.

9. The actuator as set forth in claim 5, wherein the at least one anti-torsion bar comprises eight anti-torsion bars.

10. The actuator as set forth in claim 1, further comprising a clevis coupler operatively disposed on the second end of the actuating rod.

11. An improved drawworks comprising a cable drum, at least one brake drum, at least one brake band disposed about the at least one brake drum, and a braking mechanism for operating the at least one brake band, the improvement comprising a hydraulically-operated actuator disposed in the braking mechanism, the actuator comprising:
  a) a tubular main body, the main body comprising a first end and a second end thereby defining a chamber therebetween, the main body further comprising a first end cap disposed at the first end and a second end cap disposed at the second end, thereby enclosing the chamber, the second end cap further comprising a first aperture for injecting pressurized hydraulic fluid into the chamber and a second aperture for releasing the hydraulic fluid from the chamber;

b) a fixed piston comprising first and second ends, the first end operatively coupled to the first end cap within the chamber, thereby defining an annular space about the fixed piston within the chamber;

c) a piston cylinder slidably disposed in the chamber, the piston cylinder configured for slidably receiving the second end of the fixed piston;

d) at least one spring disposed in the annular space between the first end cap and the piston cylinder, the at least one spring configured to resist the motion of the piston cylinder towards the first end cap; and e) an actuating rod operatively coupled to the piston cylinder, the actuating rod comprising first and second ends, the first end operatively coupled to the head of the piston cylinder, wherein the second end extends from the head of the piston cylinder and through a third aperture disposed through the second end cap.

12. The drawworks as set forth in claim 11, wherein the tubular main body comprises a cylindrical main body.

13. The drawworks as set forth in claim 11, wherein the fixed piston further comprising a piston passageway disposed between the first and second ends thereof thereby providing communication therebetween.

14. The drawworks as set forth in claim 13, wherein the first end cap further comprises a breather cap disposed thereon, the breather cap in communication with the piston passageway.

15. The drawworks as set forth in claim 11, wherein the actuator further comprises at least one anti-torsion bar disposed in the chamber between the first and second end caps, the piston cylinder configured to be slidably disposed on the at least one anti-torsion bar.

16. The drawworks as set forth in claim 15, wherein the at least one spring is disposed about the at least anti-torsion bar.

17. The drawworks as set forth in claim 11, wherein the piston cylinder further comprises a spring pusher, wherein the at least one spring is disposed between the first end cap and the spring pusher.

18. The drawworks as set forth in claim 11, wherein the at least one spring comprises eight springs.

19. The drawworks as set forth in claim 15, wherein the at least one anti-torsion bar comprises eight anti-torsion bars.

20. The drawworks as set forth in claim 11, further comprising a clevis coupler operatively disposed on the second end of the actuating rod.

* * * * *